United States Patent [19]
Buscher et al.

[11] 3,748,749
[45] July 31, 1973

[54] ELECTRICALLY SYNCHRONIZED CONTROLLERS

[75] Inventors: Richard G. Buscher, Woodland Hills; Richard L. Davis, Pacific Palisades, both of Calif.

[73] Assignee: Lear Siegler, Inc., Santa Monica, Calif.

[22] Filed: Dec. 30, 1971

[21] Appl. No.: 214,138

[52] U.S. Cl. ................................................. 35/11
[51] Int. Cl. .......................................... G09b 9/02
[58] Field of Search .................... 35/11, 12 B, 12 D, 35/12 F, 12 S, 22 R, 29 R; 180/77 C; 244/83 D, 83 E, 84

[56] References Cited
UNITED STATES PATENTS
2,791,915   5/1957   Merry .............................. 180/77 C

*Primary Examiner*—Wm. H. Grieb
*Attorney*—Harold L. Jackson et al.

[57] ABSTRACT

A multiple hand controller system is disclosed having redundant systems for synchronizing the movements of the hand controllers. In one embodiment, the hand controller system comprises a pair of movable hand controllers. Each hand controller is coupled to a movable ground point to be movable in two modes. The first mode is where the hand controller moves with respect to its ground point. The second mode is where the hand controller moves as a unit with its ground point. The synchronizing system comprises two sets of components. Each set includes an actuator for varying the location of the ground point of one hand controller. Each set includes a first sensor for sensing the first mode of movement for one hand controller and generating an input signal porportional to this movement. The input signal from the first sensor of each set is fed, through a summing amplifier, to the actuator of the other set. A second sensor is also provided for monitoring the movement of each ground point and generating a signal proportional to this movement. The signal from each second sensor is fed back to the summing amplifier controlling its respective actuator to be algebraically summed with the input signal from the first sensor to generate an output signal. This output signal is fed to the respective actuator to command the actuator to move the ground point location of its connected hand controller an amount representative of the movement of the other hand controller. This cross synchronization enables the movement of one hand controller in the first mode to affect a representative movement of the other hand controller in the second mode.

26 Claims, 4 Drawing Figures

FIG.1.

ELECTRICALLY SYNCHRONIZED CONTROLLERS

BACKGROUND OF THE INVENTION:

1. Field of the Invention

The present invention relates generally to multiple hand controllers for transmitting output commands, and more particularly to the means for synchronizing the movement of the hand controllers.

2. Description of the Prior Art

Many systems utilize multiple hand controllers for transmitting commands to an output network. A typical example can be found in multiple steering systems utilized in driver education courses. In such a system, a number of synchronized steering wheels are provided for simultaneously steering imaginary vehicles over a simulated track shown on a screen. One of the steering wheels is manned by the instructor so that all others manned by the students get the "feel" of the instructor's own steering movements.

Heretofore, the synchronization of such dual control systems was accomplished by mechanical means. That is, a mechanical linkage was provided between the two controllers to transmit the movement of one controller to that of the other.

Such mechanical systems function adequately when the controllers are stationed a very short distance away from each other. However, if the controllers are separated a substantial distance from each other, the linkage mechanism becomes quite complicated. It has been found that such linkages lose their reliability when they become overly complex.

SUMMARY OF THE INVENTION:

The present invention obviates this shortcoming by providing a multiple hand controller system having an electro-mechanical synchronization system that can function effectively in any type of controller arrangement.

In its broadest aspect, the system comprises more than one movable hand controller for transmitting an output command to an output network. The synchronization system includes a sensor for sensing the movement of each hand controller and generating a signal proportional to this movement. The system also includes an actuator for moving each hand controller. The sensors and actuators are cross-connected in such a manner that the signal from the sensor of one hand controller is applied to the actuator of each of the other hand controllers to command the actuator to move its connected hand controller an amount representative of the movement of the one controller.

A primary advantage of the preferred embodiment of the present invention is that electrical-mechanical and electrical signal connections between the sensors and the actuators can be easily made, no matter how far apart the hand controllers are.

Another advantage of the present invention is that the signal generated by the sensors can also be utilized in generating an output command.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

Figure 1:
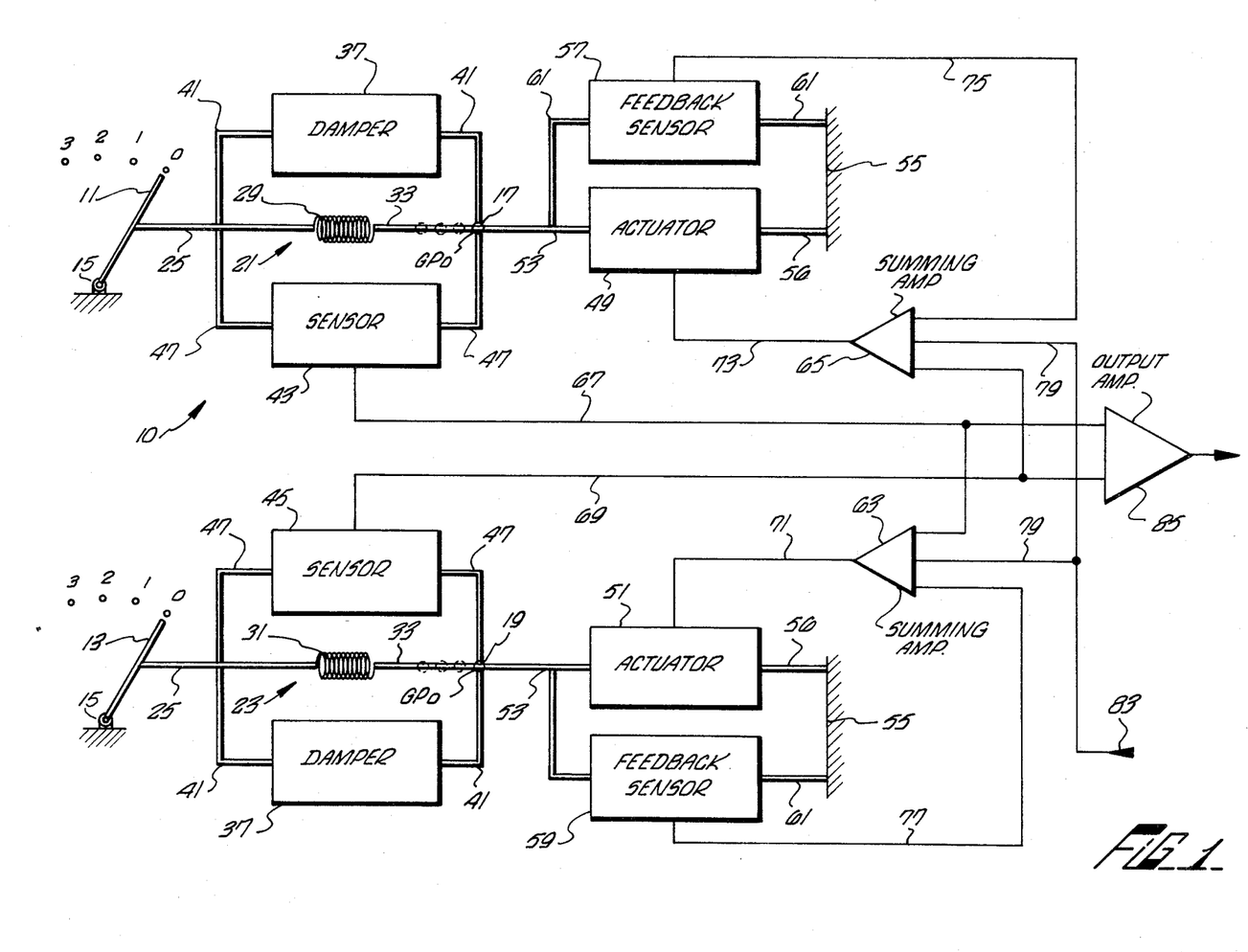
FIG. 1 is a schematic view of a multiple hand controller system of the present invention.

DESCRIPTION OF THE PREFERRED EMBODIMENT:

Referring now to the drawings, FIG. 1 illustrates a multiple hand controller system, generally indicated by arrow 10, having a pair of hand levers or controllers 11 and 13 pivotally mounted on a pair of ground pivot points 15. The hand controllers 11 and 13 are adapted to be located at the operator's control stations which can be arranged in any configuration. For example, the stations may be positioned fore and aft, in a side-by-side relationship, or remote from each other.

The hand controllers 11 and 13 are connected to a pair of movable ground points 17 and 19 via a pair of flexible transmission systems 21 and 23. Each transmission system comprises a first rigid bar 25 pivotally connected at one end to a respective hand controller 11 and 13. The other ends of the bars 25 are connected to a pair of springs 29 and 31 which, in turn, are connected to a second pair of rigid bars 33.

Each hand controller 11 and 13 is adapted to be moved fore and aft to either elongate or shorten the springs 29 and 31 with respect to the ground points 17 and 19. A damper 37 is connected to each pair of bars 25 and 33 via linkages 41. The dampers 37 can be of any conventional construction, such as a hydraulic piston and cylinder arrangement, with each damper 37 functioning in the conventional manner to dampen the movement of its respective spring.

The elongation and contraction of the springs 29 and 31 with respect to their ground points 17 and 19 are measured by a pair of sensing means as typified by a linear voltage differential transducer 43 and 45. Each transducer is interconnected via linkages 47, to the bars 25 and 33 and is constructed to provide a voltage signal that is linearly proportional to the relative movement of these bars.

The mechanical ground points 17 and 19 are connected to a pair of actuators 49 and 51 through linkages 53 to be moved thereby. Each actuator is also connected to a mechanical ground point 55 via linkages 56. As with the other components, the actuators 49 and 51 can be of any conventional construction, such as an electrically operated hydraulic ram, or a solenoid type servo motor.

The operation of the actuators 49 and 51 are monitored by a pair of linear voltage differential transducers 57 and 59. In effect, the transducers 57 and 59 function to sense the relative movement of the movable ground points 17 and 19 with their fixed ground points 55. The transducers 57 and 59 are similar in construction to the transducers 43 and 45, and are interconnected to the linkages 53 and the ground points 55 by linkages 61 to provide a feedback voltage signal that is linearly proportional to the relative movement of these members.

A pair of summing amplifiers 63 and 65 are provided to cross connect the transducers 43 and 45 with the actuators 51 and 49 respectively. Electrical lines 67 and 69 are utilized to interconnect the transducers 43 and 45 with the amplifiers 63 and 65, while electrical lines 71 and 73 interconnect the amplifiers 63 and 65 with the actuators 51 and 49.

The transducers 57 and 59 are also connected to the amplifiers 65 and 63 respectively via lines 75 and 77. Amplifiers 63 and 65 are jointly connected to an input terminal 83 for receiving input signals responsive to external conditions or commands. For example, the input signal on terminal 83 may come from a third hand controller. If such a controller were employed, it would be identical in configuration to either one of the pair of hand controllers shown in the figures. Similarly, the electrical signals from the pair would be brought to the electrical summing amplifiers as described hereinbefore. In short, any number of such hand controllers may be interconnected within the spirit and scope of the invention.

Finally, the lines 67 and 69 are also connected to an output amplifier 85 to provide an output command to an output network.

OPERATION

For explanatory purposes, the position of the hand controllers 11 and 13 shown in FIG. 1 will be called the neutral or zero position. This is the position that the controllers would assume when no outside force is applied thereto.

In operation, the two operators are positioned at their stations to manually and simultaneously control the movement of the hand controllers to provide an output command to an output network.

Figure 2:
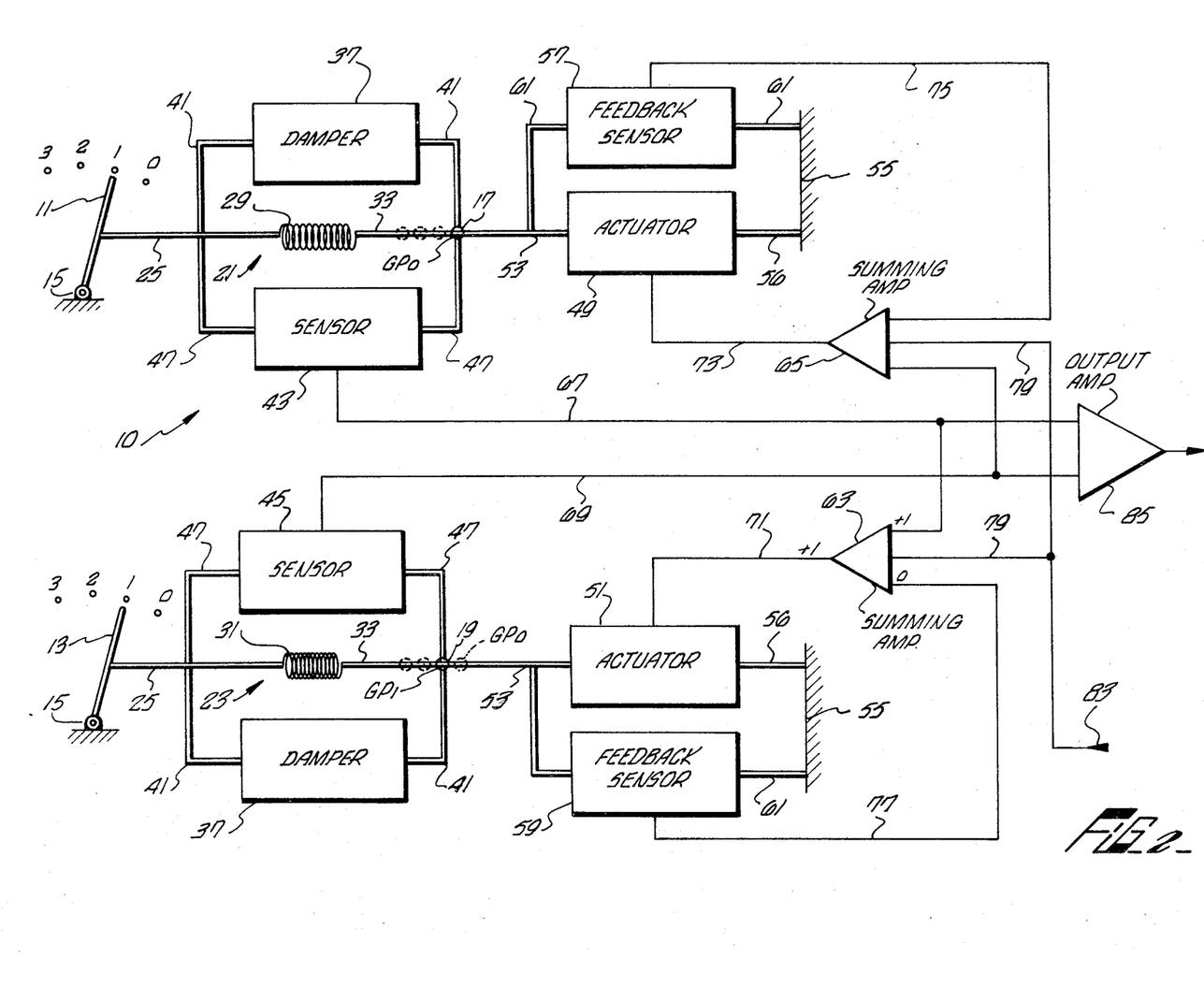
FIG. 2 is a schematic view of the hand controller system shown in a second position.

Referring now to FIG. 2, assuming the first operator wishes to create a certain output command, he would move the hand controller 11 forward from the neutral zero position. Although this movement could be any amount to effect the desired change, let us assume that the operator applies a five pound force to the controller 11 to move the controller 11 from the zero position to a first position. It is further assumed that the successive positions are divided into 5 pound force increments, merely for explanatory purposes. In moving to the first position, the ground point 17 remains fixed, at $GP_0$, and the hand controller 11 functions to elongate the spring 29. When this occurs, the transducer 43 senses this elongation and generates an input signal proportional to this movement. This input signal is then transmitted simultaneously to the output amplifier 85 and to the summing amplifier 63 as a non-inverted input signal. As stated previously, a feedback signal from the transducer 59 is also fed back to the amplifier 63 to indicate the location of the ground point 19. The amplifier functions to algebraically sum these signals by arithmetically subtracting the feedback signal from the non-inverted signal until the output signal is nulled.

Let us assume that the input signal proportional to the movement of the spring 29 is calibrated to be given a +1 value with each incremental positional movement proportional to a value of 1. This signal is fed through the summing amplifier 63 to command the actuator 51 to move the fixed point 19 forward from a point designated $GP_0$. Since the actuator 51 has not moved from its neutral position, the original feedback signal from the transducer 59 will be assumed to be a zero value.

This zero value is subtracted from the +1 value to produce the +1 output signal described above. Thereafter, the continuous movement of the actuator 51 and the ground point 19 in the forward direction is sensed by the transducer 59. The continually changing feedback signal is fed into the amplifier 63 until the signal reaches a +1 value to null the input signal from the transducer 43. When this occurs, the actuator 51 is de-energized to stop the movement of the ground point 19. At this point, the movement of the ground point 19 will have moved from $GP_0$ to $GP_1$. This movement is transmitted through the transmission 23 to the hand controller 13 to enable them to move as a unit. The total movement of the hand controller 13 in response to the input signal is calibrated to equal the movement of the hand controller 11. It should be noted that the output signal can be calibrated to produce any amount of movement in the hand controller 13 that is representative of the movement of the hand controller 11.

In this first position, the holding force of five pounds is applied by the first operator to maintain the hand controllers 11 and 13 in that position. No force is applied by the second operator, although he can sense this movement because of the force of the actuator 51 being applied to his hand controller.

Figure 3:
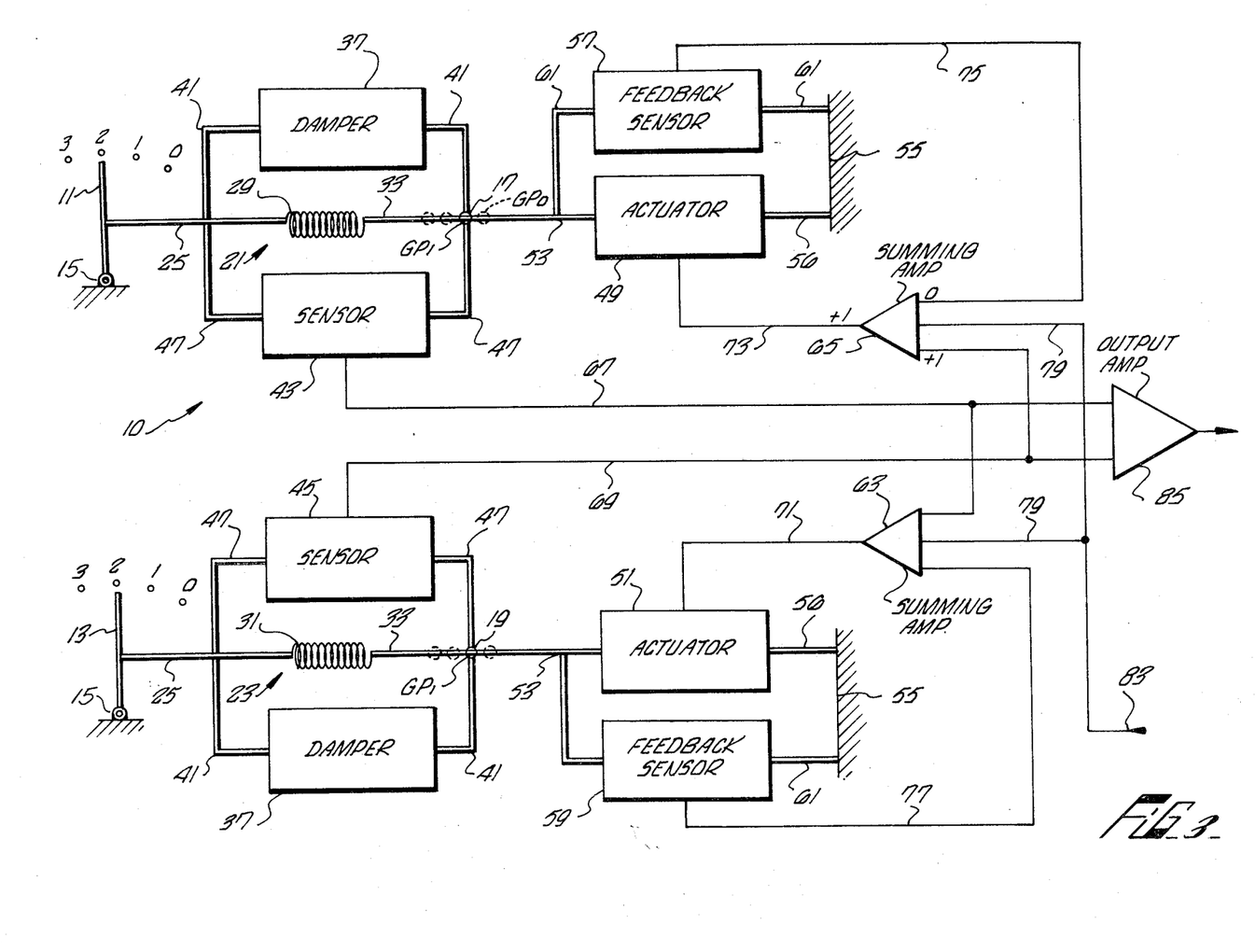
FIG. 3 is a schematic view of the hand controller system shown in a third position.

Referring now to FIG. 3, let us assume that the second operator now wishes to move the hand controller 13 forward from the first position to a second position. He would then move the hand controller 13 forward by applying a five pound force thereto. When this occurs, the hand controller 13 is moved away from the ground point 19, now at $GP_1$. The elongation of the spring 31 is then sensed by the transducer 45 to simultaneously transmit an input signal to the output amplifier 85 and the summing amplifier 65. The input signal, which is proportional to the incremental movement of the spring 31, is given the value of +1 for the reason given above and is fed into the summing applifier 65. As before, this signal is fed through the summing amplifier 65 to command the actuator 49 to move the fixed point 17 forward from the point designated $GP_0$. Since the actuator 49 and ground point 17 are originally at the zero or $GP_0$ position, the feedback signal from the transducer 57 is a zero value and is also fed into the summing amplifier 65. This value is subtracted from the +1 value of the transducer 45 to give a net output signal of +1. Thereafter, the continually changing feedback signal from the transducer 57, due to the movement of the actuator 49, is fed into the amplifier 65 until the feedback signal reaches a +1 value to null the input signal from the transducer 45. When this occurs, the actuator 49 is de-energized to stop the movement of the ground point 19. At this point, the movement of the ground point 19 will have moved from $GP_0$ to $GP_1$. This movement is such to enable the hand controller 11 and the transmission 21 to move forward as a unit to the new position 2 already acquired by controller 13. As this occurs, the first operator senses this movement and is able to monitor the operation of the second operator. In this position, both operators are applying a five pound force on their respective hand controllers.

Figure 4:
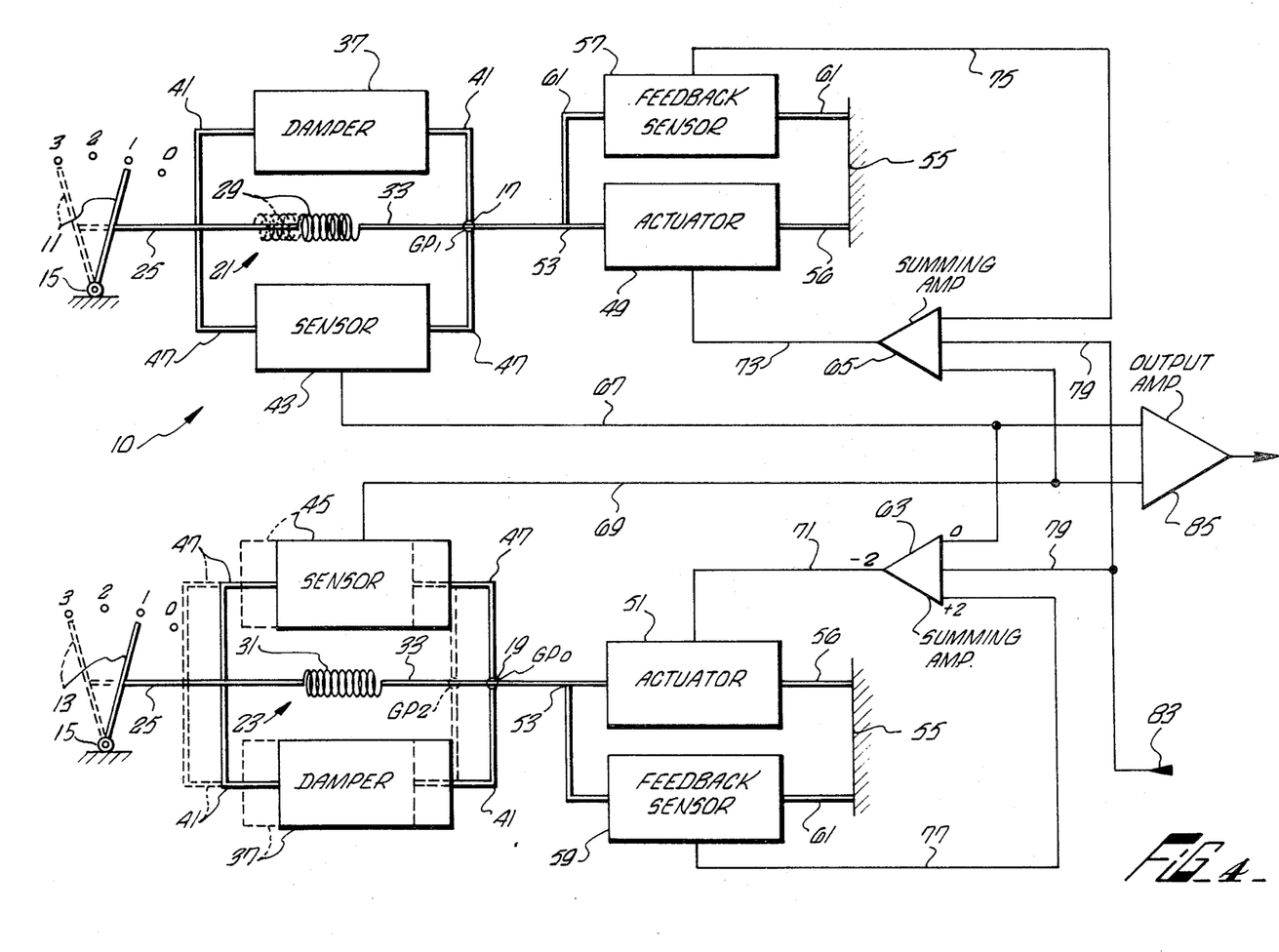
FIG. 4 is a schematic view of the hand controller system shown being returned from a fourth position to the aforementioned second position.

Let us assume that the first operator now wishes to move the hand controller 11 from position 2 to position 3. The input signal from the transducer 43 sensing the additional elongation of the spring 29 will have a value of +2 (equal to a 10 pound force). The original feedback signal from the transducer 59 will be a +1 since the ground point 19 has moved from $GP_0$ to be presently located at $GP_1$. This +1 signal value is subtracted from the +2 of the transducer 43 to result in a +1 output signal to command the actuator 51 to move the ground point 19 forward until the feedback signal equals a +2. At this point, the ground point 19 will have moved to a new position $GP_2$ which is the amount necessary to enable the hand controller 13 and the transmission 23 to move forward as a unit to position 3. This third position is shown in FIG. 4.

Assuming both hand controllers are now in position 3, and the first operator wishes to return his hand controller to position 1, he would first release his ten pound holding force on the hand controller 11 to allow the spring 29 to shorten to its original length. The movement is sensed by the transducer 43 which emits a signal having a value of 0 since the spring has moved through a distance equal to two positions back to its original position. Since the ground point 19 is at $GP_2$, the +2 feedback signal is subtracted from 0 input signal at the amplifier 63 to give a −2 output signal. As a result, the actuator is commanded to move the ground point 19 rearward from the position $GP_2$ until the feedback signal equals the zero value input signal. At this point, the ground point 19 will have moved from $GP_2$ to $GP_0$ to enable the hand controller 13 and the transmission 23 to be moved as a unit to position 1. The movement described above is shown in FIG. 4. In this first position, the only force applied to the system is the 5 pound force by the second operator.

It should be noted that both types of movement can occur simultaneously. For example, both operators can apply a 5 pound force to their hand controllers. In this instance each hand controller will move relative to its ground point one positional increment with the generated input singals moving both ground points to enable both controllers to move as a unit with their ground points one incremental position.

It should also be noted that at any time, the input signal from terminal 83, which is responsive to external conditions, can be applied to give a correctional command to the summing amplifiers 63 and 65. As stated previously, an additional hand controller system identical to the one described can also be employed to provide such an input signal. Moreover, although two hand controller systems are illustrated, any number of systems can be utilized with the input signal from the movement of each hand controller being fed to all of the other hand controller actuators to move the ground points of the other hand controllers. The respective feedback systems for each actuator will monitor the movement of the actuator until the actual location of the ground point agrees with that of the input command.

Moreover, although an electrical synchronizing system is shown, a hydraulic system can also be utilized in the system in accordance with the present invention. In this embodiment, hydraulic servos and lines would replace the electrical servos and lines shown in the drawings. In addition, fluid amplifiers would be utilized to algebraically sum the hydraulic input signals from the hydraulic sensors and the hydraulic feedback signals from the hydraulic feedback sensors.

It would also be within the purview of the present invention for the hand controllers to rotate such as steering wheels. In this configuration, the steering wheels would rotate with respect to a movable ground position, with the sensors measuring the angular movement of the wheels.

As can be seen, a multiple hand controller system is provided in which a synchronizing system is utilized to synchronize the movement of the hand controllers to enable each operator to sense the controlling movements of the other operators. The primary importance of this system is that the lines interconnecting the various components enable the components and hence the operating stations to be remotely positioned a great distance with respect to each other.

It should be noted that various modifications can be made to the apparatus while still remaining within the purview of the following claims.

What is claimed is: comprising:

1. A multiple interconnected control system comprising:
   a number of movable controllers for transmitting an output command to an output network;
   a movable reference ground point for each controller, each controller being operatively connected to a respective movable ground point to move as a unit with said movable ground point, each controller further being movable relative to its connected movable ground point;
   means for sensing the movement of each controller and generating an input signal proportional to this movement; and
   actuator means for moving each controller, the actuator means of its connected controller being responsive to the signal from the sensing means of each of the other controllers for moving its connected controller an amount representative of the movement of the respective other controllers.

2. The invention of claim 1 further comprising resilient means for interconnecting each controller with its respective movable ground point, each controller being manually operable by an operator.

3. The invention of claim 1 wherein each of said actuator means is operatively connected to a fixed ground point for moving said movable ground point.

4. The invention of claim 3 further comprising feedback means for sensing the movement of each movable ground point and generating a feedback signal proportional to this movement.

5. The invention of claim 3 wherein each of said feedback means comprises a linear voltage differential transducer capable of generating voltage input signals.

6. The invention of claim 4 further comprising summing means for receiving the input signals from each of the sensing means of the other controllers and the feedback signal from the feedback means sensing the movable ground point location of the one controller, said summing means algebraically summing said voltage signals to generate an output signal.

7. The invention of claim 6 wherein said summing means is connected to the actuator moving the movable ground point of the one controller for commanding said actuator to move said movable ground point an amount related to said output signal.

8. The invention of claim 6 further including means responsive to exterior conditions and commands for feeding a correctional signal to each of said summing means.

9. The invention of claim 7 wherein said summing means comprises a summing amplifier.

10. The invention of claim 1 further comprising a spring interconnecting each controller with its respective movable ground point.

11. The invention of claim 10 wherein each of said sensing means comprises means for sensing the elongation of said spring with respect to its respective movable ground point connection.

12. The invention of claim 11 wherein each of said electro-mechanical sensing means comprises a linear voltage differential transducer capable of generating voltage input signals.

13. The invention of claim 1 further comprising an output amplifier for receiving the signals from said sensing means and generating an output signal in response to said input signals.

14. In a multiple controller system comprising:
at least a pair of movable controllers;
a pair of movable ground points, respectively connected to said controllers;
first actuator means for moving one controller in response to an input signal;
second actuator means for moving the other controller in response to an input signal;
first sensing means for sensing the movement of the one controller and generating an input signal proportional to this movement;
second sensing means for sensing the movement of the other controller and generating an input signal proportional to this movement; and
means for interconnecting said first actuator means with said second sensing means to enable the second sensing means to apply an input signal to the first actuator means to move the one controller an amount representative of the movement of the other controller, at least one controller capable of moving both with its respective movable ground point and also moving relative to the respective movable ground point.

15. The invention of claim 14 further comprising means for interconnecting said second actuating means with said first sensing means to enable the first sensing means to apply an input signal to the second actuator means to move the other controller an amount representative of the movement of the one controller.

16. The invention of claim 15 wherein each of said sensing means are capable of sensing the movement of each controller with respect to its connected movable ground point.

17. The invention of claim 15 wherein each of said actuator means is operatively connected to a respective movable ground point for moving said movable ground point and controller as a unit.

18. The invention of claim 27 further comprising first and second feedback means for respectively sensing the movement of said first and second actuator means and generating feedback signals proportional to the respective movements of the actuator means.

19. The invention of claim 18 further comprising first summing means for receiving the input signal from the first sensing means and the feedback signal of the second feedback means, said first summing means algebraically summing the two signals for generating an output signal which is applied to the second actuator means for commanding said second actuator means to move its connected movable ground point in response to said output signal.

20. The invention of claim 19 wherein said first summing means comprises a summing amplifier.

21. The invention of claim 18 further comprising second summing means for receiving the input signal from the second sensing means and the feedback signal from said first feedback means, said second summing means algebraically summing the two signals for generating an output signal which is applied to the first actuator means for commanding said first actuator means to move its connected movable ground point in response to said output signal.

22. The invention of claim 21 wherein said second summing means comprises a summing amplifier.

23. The invention of claim 18 wherein said first and second feedback means comprise a pair of linear voltage differential transducers for generating feedback voltage signals.

24. The invention of claim 14 wherein said first and second sensing means comprise a pair of linear voltage differential transducers for generating input voltage signals.

25. In a hand controller system comprising:
a pair of movable hand controllers;
a pair of movable reference ground points connected respectively to said hand controllers;
first actuator means for moving one hand controller in response to an input signal;
second actuator means for moving the other hand controller in response to an input signal;
first sensing means including a first linear voltage differential transducer for sensing the movement of the one hand controller and generating an input signal proportional to this movement;
second sensing means including a second linear voltage differential transducer for sensing the movement of the other hand controller and generating an input signal proportional to this movement; and
means for interconnecting said first actuating means with said second sensing means to enable the second sensing means to apply an input signal to the first actuator means to move the one hand controller an amount representative of the movement of the other hand controller and
means for interconnecting said second actuating means with said first sensing means to enable the first sensing means to apply an input signal to the second actuator means to move the other hand controller an amount representative of the movement of the other hand controller.

26. In a hand controller system comprising:
a pair of movable hand controllers;
a pair of movable ground points respectively connected to said hand controllers;
first actuator means for moving one hand controller in response to an input signal;
second actuator means for moving the other hand controller in response to an input signal, each of said actuator means is operatively connected to a respective movable ground point for moving said movable ground point and hand controller as a unit;
first and second feedback means for respectively sensing the movement of said first and second actuator means and generating feedback signals proportional to the respective movements of the actuator means;

first sensing means for sensing the movement of the one hand controller and generating an input signal proportional to this movement;

second sensing means for sensing the movement of the other hand controller and generating an input signal proportional to this movement; and means for interconnecting said first actuating means with said second sensing means to enable the second sensing means to apply an input signal to the first actuator means to move the one hand controller an amount representative of the movement of the other hand controller;

means for interconnecting said second actuating means with said first sensing means to enable the first sensing means to apply an input signal to the second actuator means to move the other hand controller an amount representative of the movement of the one hand controller and first summing means for receiving the input signal from the first sensing means and the feedback signal of the second feedback means, said first summing means algebraically summing the two signals for generating an output signal which is applied to the second actuator means for commanding said second actuator means to move its connected movable ground point in response to said output signal.

* * * * *

UNITED STATES PATENT OFFICE
CERTIFICATE OF CORRECTION

Patent No. 3,748,749   Dated July 31, 1973

Inventor(s) Richard G. Buscher and Richard L. Davis

It is certified that error appears in the above-identified patent and that said Letters Patent are hereby corrected as shown below:

Column 6, line 15, "comprising:" should be deleted.

Column 7, line 54, "27" should be "17".

Signed and sealed this 25th day of December 1973.

(SEAL)
Attest:

EDWARD M. FLETCHER, JR.
Attesting Officer

RENE D. TEGTMEYER
Acting Commissioner of Patents